United States Patent [19]
Phan et al.

[11] Patent Number: 6,064,437
[45] Date of Patent: May 16, 2000

[54] METHOD AND APPARATUS FOR SCALING AND FILTERING OF VIDEO INFORMATION FOR USE IN A DIGITAL SYSTEM

[75] Inventors: Michael H. Phan, Antelope; Joseph D. Harwood, Milpitas, both of Calif.

[73] Assignee: Sharewave, Inc., El Dorado Hills, Calif.

[21] Appl. No.: 09/151,505

[22] Filed: Sep. 11, 1998

[51] Int. Cl.$^7$ ..................................................... H04N 7/01
[52] U.S. Cl. ........................................... 348/446; 348/447
[58] Field of Search ..................................... 345/127, 327; 348/446, 447, 910, 607, 622, 625

[56] References Cited

U.S. PATENT DOCUMENTS

| | | | |
|---|---|---|---|
| 5,455,628 | 10/1995 | Bishop | 348/446 |
| 5,815,208 | 9/1998 | Samela et al. | 348/446 |
| 5,844,541 | 12/1998 | Cahill, III | 345/127 |
| 5,852,437 | 12/1998 | Wugofski et al. | 345/327 |
| 5,880,721 | 3/1999 | Yen | 345/327 |
| 5,894,330 | 4/1999 | Huang et al. | 348/447 |
| 5,912,711 | 6/1999 | Lim et al. | 348/446 |
| 5,914,728 | 6/1999 | Yamagishi et al. | 345/127 |
| 5,963,262 | 10/1999 | Ke et al. | 348/446 |

*Primary Examiner*—Victor R. Kostak
*Attorney, Agent, or Firm*—Blakely, Sokoloff, Taylor & Zafman LLP

[57] ABSTRACT

Video information which is organized in a first format is converted to a second format by first scaling the video information to produce scaled video information and then color correcting the scaled video information to produce color corrected video information at a network server. Scaling the video information may be accomplished by first applying a vertical scaling process to the video information to produce vertically scaled video information. Second, an anti-flicker filter may be applied to the vertically scaled video information to produce the scaled video information. The vertical scaling process includes a pixel-by-pixel conversion process wherein, for each group of six scan lines in a frame of the video information, color information for individual pixels which make up the group of six scan lines is scaled to provide color information for pixels in a corresponding group of five scan lines of a frame of the vertically scaled video information. The anti-flicker filter comprises a pixel-by-pixel conversion process wherein for each group of three scan lines in a frame of the vertically scaled video information, color information for individual pixels which make up the three scan lines is scaled to provide color information for pixels in a corresponding scan line of a frame of the scaled video information. Color correcting the scaled video information generally comprises converting R-G-B color information of the scaled video information to Y-U-V color information. The color corrected video information may then be transmitted to a network client via a wireless communication link.

31 Claims, 3 Drawing Sheets

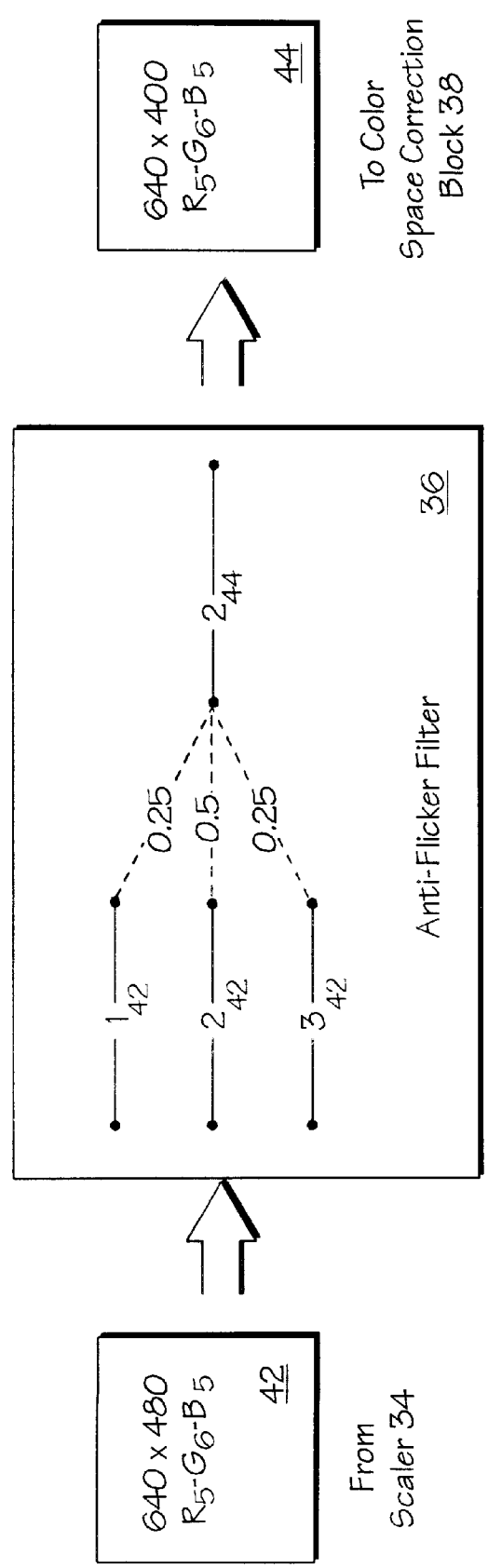

METHOD AND APPARATUS FOR SCALING AND FILTERING OF VIDEO INFORMATION FOR USE IN A DIGITAL SYSTEM

FIELD OF THE INVENTION

The present invention relates to the preprocessing of video information generated for display on a non-interlaced computer display prior to presentation on an interlaced television display.

BACKGROUND

With the convergence of digital information in the home, a need has arisen for the integration of home computers with other information appliances. In co-pending application Ser. Nos. 08/792,003 and 08/792,361, both filed Jan. 31, 1997, and assigned to the Assignee of the present invention, an exemplary digital wireless home network was described. The network has at its heart an information furnace that allows users to enjoy a variety of multimedia content distributed from a host computer to various appliances throughout the home. Within this vision of the information furnace, the home computer is established as the central aggregation point for digital content in the home, which content is then wirelessly distributed to locations and appliances throughout the home that are optimal for its consumption. These alternative consumption locations enable new dynamics in the use of multimedia content, including mobility, comfort, social interaction, and linkages with other household appliances, such as audio/visual systems. The information furnace further allows users to consume the content in their preferred locations (and even be mobile in the home if desired), enables multiple users to simultaneously interact with the content, and reduces the cost of the appliances used to access the content (computing resources, such as the CPU, memory and modem are leveraged from a central source).

The distribution of video information as part of the home network environment presents certain challenges for the network designer. For example, digital video information ordinarily destined for display on a computer monitor or other display unit is generally provided in an R-G-B (red-green-blue), noninterlaced format for that video display unit. If consumer appliances such as televisions are to make use of the video information, the format of this information must be altered to an acceptable format (e.g., NTSC compatible, interlaced video information). Thus, what is needed is a scheme for preprocessing the video information prior to presentation on the television display screen.

SUMMARY OF THE INVENTION

In one embodiment, the present invention provides a process wherein video information which is organized in a first format is converted to a second format by first scaling the video information to produce scaled video information and then color correcting the scaled video information to produce color corrected video information. Scaling the video information may be accomplished by first applying a vertical scaling process to the video information to produce vertically scaled video information. Second, an anti-flicker filter may be applied to the vertically scaled video information to produce the scaled video information. Each of these processes is preferably applied at a network server, prior to the transmission of the video information to a network client across a wireless link.

The vertical scaling process includes a pixel-by-pixel conversion process wherein, for each group of six scan lines in a frame of the video information, color information for individual pixels which make up the group of six scan lines is scaled to provide color information for pixels in a corresponding group of five scan lines of a frame of the vertically scaled video information. In general, scaling factors used for the color information for individual pixels of each group of six scan lines in the frame of the video information vary between the scan lines. For example, in one embodiment the color information for pixels of a first scan line of the group of six scan lines from the frame of the video information may be scaled by a factor of 1 to form the color information for the pixels of a first scan line of the group of five scan lines from the frame of vertically scaled video information.

The color information for pixels in the remaining scan lines of the group of six scan lines from the frame of video information may then be merged, on a scan line basis, to form the color information for the pixels of the remaining scan lines of the group of five scan lines from the frame of vertically scaled information. In such a case, the color information for pixels in the remaining scan lines of the group of six scan lines from the frame of video information may be scaled by a predetermined factor, on a scan line basis, prior to being merged to form the color information for the pixels of the remaining scan lines of the group of five scan lines from the frame of vertically scaled information. In one particular embodiment, the color information for pixels in the scan lines of the group of six scan lines from the frame of video information is normalized prior to being scaled.

The anti-flicker filter uses three scan lines of a frame of the vertically scaled video information to produce one scan line of a frame of the scaled video information. More specifically, the anti-flicker filter comprises a pixel-by-pixel conversion process wherein for each group of three scan lines in a frame of the vertically scaled video information, color information for individual pixels which make up the three scan lines is scaled to provide color information for pixels in a corresponding scan line of a frame of the scaled video information. Scaling factors used by the anti-flicker filter for scaling the pixel color information of the three scan lines of the frame of the vertically scaled video information vary on a scan line basis. In one particular embodiment, the anti-flicker filter is configured to normalize multi-bit values of red, green and blue color information of the pixels in the three scan lines of the frame of the vertically scaled video information before applying the scaling factors.

Color correcting the scaled video information generally comprises converting R-G-B color information of the scaled video information to Y-U-V color information. In some cases, the R-G-B color information is normalized to an eight-bit format prior to converting the R-G-B color information to Y-U-V color information. Further, the Y-U-V color information for the color corrected video information may be formatted as 4:2:2 digital component video.

BRIEF DESCRIPTION OF THE DRAWINGS

The present invention is illustrated by way of example, and not limitation, in the figures of the accompanying drawings in which like reference numerals refer to similar elements and in which:

FIG. 5 is a graphical representation of an example of the anti-flicker filtering performed by the video processor shown in FIG. 3 in accordance with one embodiment of the present invention.

DETAILED DESCRIPTION

A video-processing scheme which may find application in a digital wireless home network or other computer network environments is disclosed herein. Although discussed with reference to certain illustrated embodiments, upon review of this specification, those skilled in the art will recognize that the present invention may find application in a variety of systems. Therefore, in the following description the illustrated embodiments should be regarded as exemplary only and should not be deemed to limit the scope of the present invention.

Figure 1:
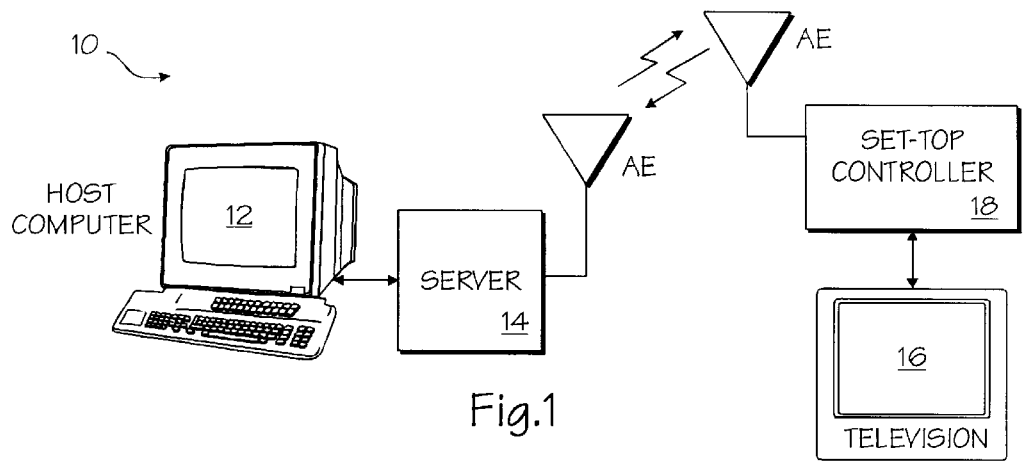
FIG. 1 illustrates components of a digital wireless home network according to one embodiment of the present invention.

FIG. 1 illustrates a digital wireless home network 10 configured in accordance with one embodiment of the present invention. Digital wireless home network 10 has at its heart a personal computer 12 and an accompanying server 14. Together, personal computer 12 and server 14 act as a central aggregation point for digital content (e.g., video, audio and graphical information), which content may then be wirelessly distributed to various locations and appliances, including television 16. Television 16 receives this digital content through set-top controller 18, which is coupled in wireless communication with server 14. Of course, in other embodiments, the wireless communication link between server 14 and set-top controller 18 may be replaced by a wired communication link. Also, although server 14 and set-top controller 18 are illustrated as separate components, in other embodiments the functions of server 14 may be included wholly or partially within personal computer 12 and those of set-top controller 18 may be included wholly or partially within television 16.

Included within the digital content transferred to television 16 across network 10 is video information. In one embodiment, the video information comprises digitally encoded video images relating to applications such as videoconferencing, interactive computing, entertainment and/or educational programming, etc. Preferably, this video information is transferred in a compressed data format to ease bandwidth requirements on the wireless (or wired) communication link.

Within the environment of network 10, the video information transferred to television 16 may originate as synthetic or computer-generated video information as may be produced or utilized by an application program running on personal computer 12. For example, network 10 allows a user session (separate from any other session that may be hosted on personal computer 12) to be initiated using set-top controller 18 as a gateway to personal computer 12 (e.g., via server 14). Thus, television 16 may be used as a display device for this session. As part of the session, computer-generated images (such as may comprise a user desktop and/or application specific image) will be displayed on television 16.

In general, the computer-generated video information for display on television 16 will be produced in a format more suited for display on a conventional, noninterlaced computer monitor. This is because computer application programs and operating systems are generally configured to provide video information for display on such devices. Therefore, before this video information can be displayed on television 16, it will have to be converted into a compatible format, for example, interlaced NTSC-compatible video. Server 14 and set-top controller 18 provide the necessary video display processing means to generate video information suitable for display on television 16 from the computer-generated video information provided by host computer 12.

Figure 2A:
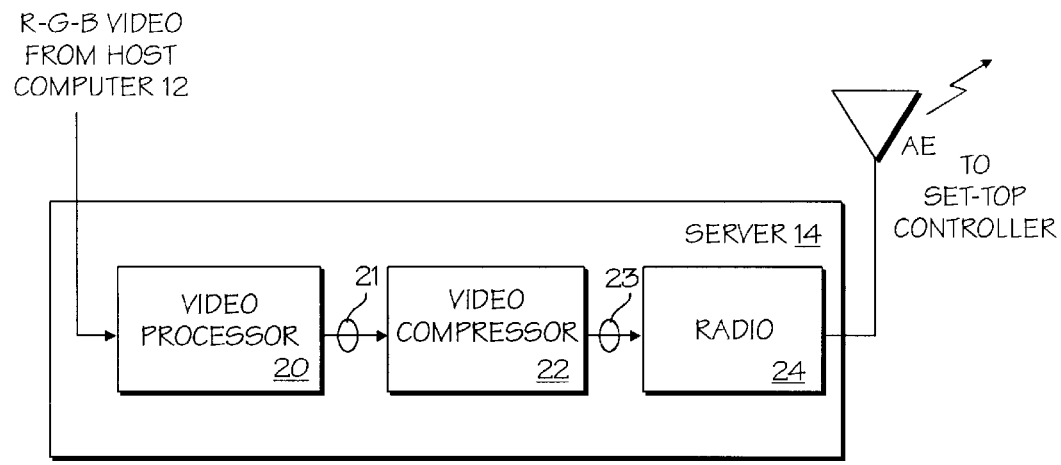
FIG. 2A is a functional representation of a server component of the digital wireless home network illustrated in FIG. 1 according to one embodiment of the present invention.
Figure 2B:
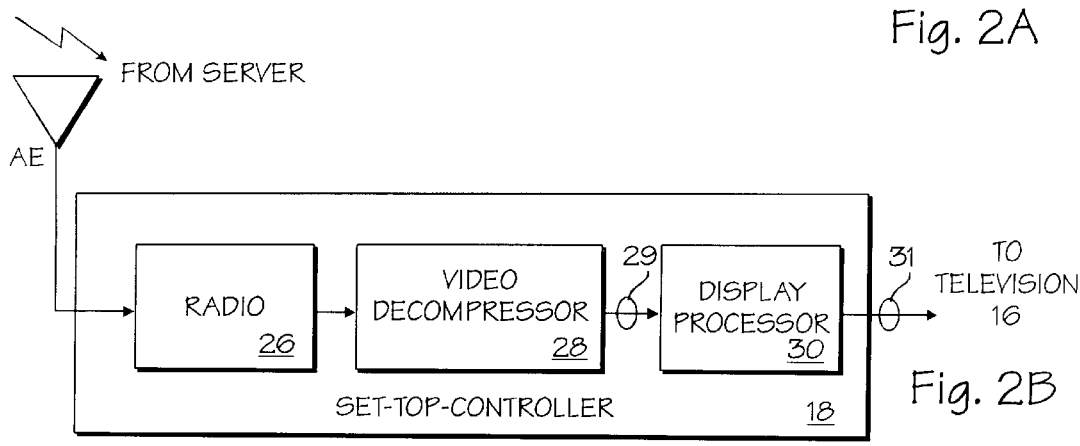
FIG. 2B is a functional representation of a set-top controller component of the digital wireless home network illustrated in FIG. 1 according to one embodiment of the present invention.

FIGS. 2A and 2B illustrate the functional components of server 14 and set-top controller 18 used in the conversion of the video information to a format suitable for display on television 16. As shown in FIG. 2A, video processor 20 receives video information from host computer 12. Video processor 20 is responsible for scaling the video information to a size appropriate for display on television 16. In general, computer-generated video information is produced with a vertical resolution that exceeds the usable display range of television 16, thus vertical scaling is required to fit the information into the display area provided by television 16. As part of the scaling process, video processor 20 may utilize anti-flicker filtering to reduce or eliminate the effects of flicker on the eventual display.

Many times, computer-generated video information is produced in an R-G-B (red-green-blue) format common to computer display devices. Although such video information may be transmitted within digital network 10, in one embodiment, video processor 20 is configured to convert the R-G-B information in the appropriately scaled video image into another color scheme, e.g., Y-U-V color space, which is more suitable for transmission to television 16. In Y-U-V color space, Y represents the luma component of the video information while U and V represent the color difference components.

The scaled video information 21 is provided to video compressor 22 where it is reformatted prior to transmission to television 16. Any of a number of conventional video compression techniques may be used to reduce the bandwidth requirements of the video information 21. In one embodiment, a video compressor which utilizes a wavelet compression scheme may be used. As indicated above, the use of a video compressor 22 is optional, however, any scheme which does not employ some form of video compression will require more bandwidth for the transmission of the video information than schemes which do.

The compressed video data 23 is provided to a radio 24 which may packetize the data for transmission across the wireless communication link to set-top controller 18. In those schemes which rely on a wired communication link, other suitable media access devices (e.g., Ethernet access modules, etc.) may be used in place of radio 22. In one embodiment, radio 22 communicates with set-top controller 18 using a wireless, spread spectrum communication protocol adapted for use in network 10.

Now referring to FIG. 2B, at set-top controller 18 the video information from server 14 is received by radio 26. Radio 26 is configured to operate according to the same protocol as radio 24 in server 14, hence, the two radios 24 and 26 serve as the communication access devices for network 10. As indicated above, in other embodiments, e.g., where different communications media are used, other suitable communication media access devices may be used. Radio 26 may perform frame reconstruction operations to build up a complete frame of information from several packets that were transmitted by radio 24. Ultimately, radio 26 provides a frame's worth of compressed video information to a video decompression engine 28.

Video decompression engine 28 expands the compressed video information received from server 14 into a decompressed format and provides the resulting video information signals 29 to a display processor 30. Display processor 30 formats the video signals 29 into the required format for display on television 16. For example, in some embodiments, display processor 30 may provide the necessary horizontal and or vertical synchronization signals as well as dithering control and interlacing sequences required to display the video information on a conventional NTSC compatible television 16. Thus, set-top controller 18 provides NTSC (or other, e.g., PAL) compatible television video signals 31 to television 16.

Figure 3:
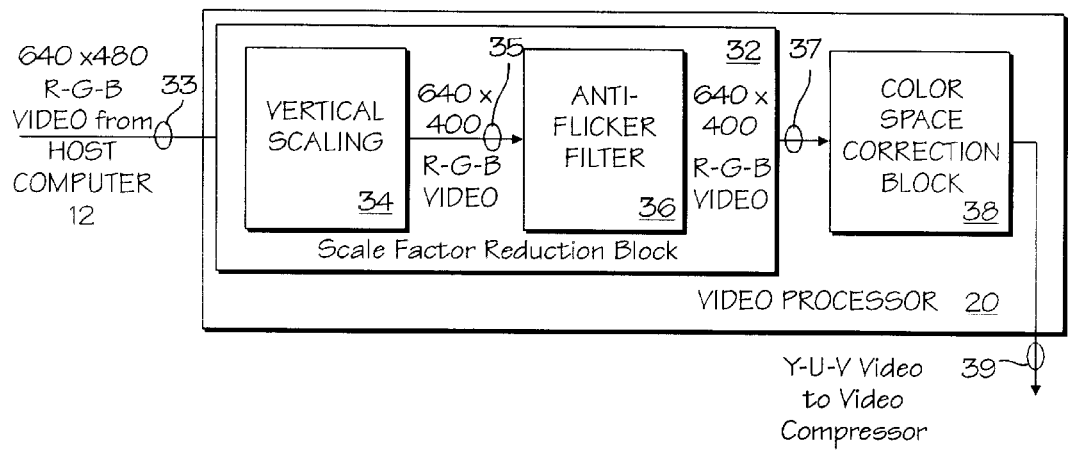
FIG. 3 illustrates the functional components of a video processor for the server component of the digital wireless home network illustrated in FIG. 2 according to one embodiment of the present invention.

FIG. 3 now illustrates one embodiment of video processor 20 of server 14 in more detail. Video processor 20 includes a scale factor reduction (SFR) block 32 which is configured to scale video information received from host computer 12 into a format suitable for display by television 16. For this embodiment, video information produced by host computer 12 is provided in the form of R-G-B video frames of 640×480 resolution. That is, the video information is coded in digital R-G-B format, e.g., with 16 bits of information organized as five bits of red color information, six bits of green color information and five bits of blue color information. Each frame includes 307,200 pixels, arranged into 480 horizontal scan lines, each 640 pixels long. This is a conventional video format provided by many computer applications. However, because a conventional television 16 may not allow for the display of all 480 scan lines, this video information is vertically scaled SFR block 32 so that the video information will fit into the display space provided by television 16.

This scaling is performed by vertical scaling block 34. In general, vertical scaling block 34 scales the video information signals 33 by 5/6 in the vertical, so that all 480 scan lines of one video frame are reproduced in 400 scan lines of a scaled video information signal 35. That is, the effective vertical resolution of the video information signal is reduced from 480 to 400 scan lines by vertical scaling block 34. Thus, vertical scaling block 34 provides at its output, video information signals 35, which are in R-G-B, 640×400 format.

The scaled video information signals 35 may now be applied to anti-flicker filter 36 of SFR block 32. Anti-flicker filter 36 provides noninterlaced-to-interlaced conversion of the video information signals 35 using 3-line vertical filtering. That is, three scan lines of noninterlaced video data present in video information signals 35 are used to generate a single scan line for interlaced video information signals 37. Thus, the output of anti-flicker filter 36 is R-G-B, 640×400 interlaced video information signals 37.

The video information signals 37 are then applied to color space correction (CSC) block 38. As noted above, this block is optional, as R-G-B video information signals may be transmitted within network 10. However, for this embodiment, the R-G-B video information signals 37 are converted to Y-U-V video information signals 39 prior to transmission. CSC block 38 performs this conversion and may, in one embodiment, provide the Y-U-V video information signals 39 as sub-sampled YU and YV data pairs. The manner in which such data organization is accomplished is discussed in greater detail below.

Figure 4:
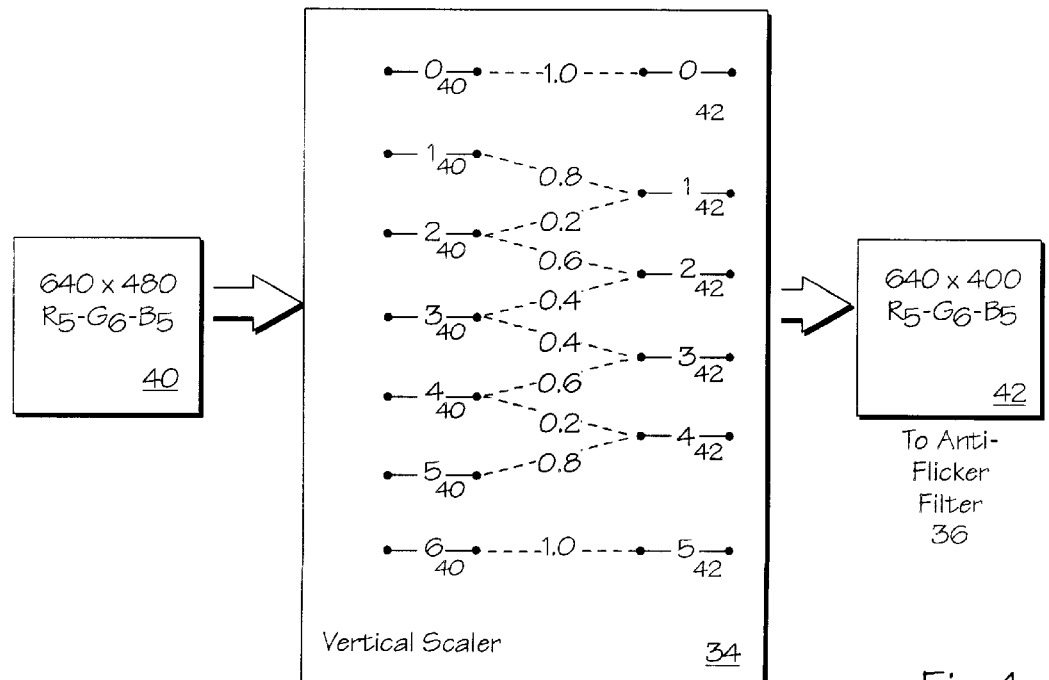
FIG. 4 is a graphical representation of an example of the vertical scaling operations performed by the video processor shown in FIG. 3 in accordance with one embodiment of the present invention.

FIG. 4 illustrates the basic functionality of the vertical scaler 32. As shown, a 640×480 frame of R-G-B video data 40 is converted to a 640×400 frame of R-G-B video data 42 by vertically scaling frame 40 by 5/6. As a result, the 480 scan lines of frame 40 are reduced to 400 scan lines in frame 42.

To produce frame 42 at this lower resolution, a pixel-by-pixel conversion process is applied. For each group of six scan lines in frame 40 (numbered 040–540 in FIG. 4), color information for the individual pixels which make up those scan lines is scaled to provide color information for the pixels in a corresponding group of five scan lines (labeled 042–442 in FIG. 4) of frame 42. Note that scan line 640 and 542 shown in FIG. 4 represent the first scan lines of the next groupings in the respective frames.

The scaling factor used for the pixel color information varies depending on the scan line of interest. For example, in the illustrated embodiment, color information for pixels of scan line 040 of a group of six scan lines from frame 40 is scaled by a factor of 1.0 (i.e., the color information is unaltered) to produce the color information for the pixels in a corresponding scan line 042 of a group of five scan lines in frame 42. The color information from pixels in scan lines 140–540 of frame 40 is merged, on a scan line basis, to form the color information for the pixels of scan lines 142–442 of frame 42. For example, the color information of pixels in scan line 140 is scaled by a predetermined factor (80% or 0.8 in the illustrated embodiment) and combined with the color information of pixels in scan line 240 also scaled by another predetermined factor (20% or 0.2 for the illustrated embodiment) to form the color information for the pixels of scan line 142. Similar scalings and mergings of the color information of the pixels in adjacent scan lines of frame 40 are used to produce the color information for pixels in the scan lines of frame 42 as shown in FIG. 4. Table 1 below provides exemplary scalings and combinations which correspond to the illustrated embodiment, however, it should be appreciated that other scaling factors could be used.

TABLE 1

| Scan Line in Frame 42 | Scaling of Color Information for Pixels in Scan Lines of Frame 40 |
| --- | --- |
| 042 | 1.0*040 |
| 142 | 0.8*140 + 0.2*240 |
| 242 | 0.6*240 + 0.4*340 |
| 342 | 0.4*340 + 0.6*440 |
| 442 | 0.2*440 + 0.8*540 |

As indicated above, the R-G-B color information for the pixels of frame 40 is preferably presented in 16-bit format, with five bits of red and blue color information each and six bits of green color information. Before scaling this color information to produce the color information for the pixels of frame 42, however, these values are preferably rounded up (i.e., normalized) to eight bit values. This normalizing may be accomplished using conventional zero-padding.

Then, the individual scaling coefficients may be represented in eight-bit format as follows:

$0.2 = 33h = 00110011$ $0.4 = 66h = 01100110$ $0.6 = 9Ah = 10011010$ $0.8 = CDh = 11001101$ where h represents hexadecimal notation.

Thus, the new pixel color information (Xnew, i.e., Rnew, Gnew and Bnew) for the scan lines in frame 42 may be calculated in 8-bit (Xnew$_{8.8}$) format as:

$$Xnew_{8.8} = coefficient_{0.8} * X_{8.0},$$

where $X_{8.0}$ represents the old pixel color information from the frame 40 scan lines in 8-bit format and coefficient$_{0.8}$ represents the 8-bit value of the scaling coefficients given above. These color values may then be truncated to five/six bit values to give the new R-G-B color information for the pixels of scan lines in frame 42, where there are five bits of red and blue color information each and six bits of green color information. Frame 42 can then be passed to the anti-flicker filter 36 as discussed above.

FIG. 5 illustrates the functionality of anti-flicker filter 36 in greater detail. Anti-flicker filter 36 uses three scan lines of the 640×480, R-G-B frame 42 to produce one scan line of a 640×400, R-G-B frame 44 to smooth fast transitions over several interlaced scan lines. Note that at the beginning and end of the frame 42, only the adjacent two scan lines from frame 42 are used in this smoothing operation, instead of three scan lines as used elsewhere.

To produce frame 44, a pixel-by-pixel conversion process is applied. For each group of three scan lines in frame 42 (numbered 142–342 in FIG. 5), color information for the individual pixels which make up those scan lines is scaled to provide color information for the pixels in a corresponding scan line (labeled 244 in FIG. 5) of frame 44. The scaling factor used for the pixel color information varies depending on the scan line of interest. For example, in the illustrated embodiment, color information for pixels of scan line 142 of a group of three scan lines from frame 42 is scaled by a factor of 1/4. This color information is merged, on a scan line basis, with scaled color information from pixels in scan lines 242 and 342 to form the color information for the pixels of scan line 244 of frame 44. Table 2 below provides exemplary scalings and combinations which correspond to the illustrated embodiment, however, it should be appreciated that other scaling factors could be used.

TABLE 2

| Scan Line in Frame 44 | Scaling of Color Information for Pixels in Scan Lines of Frame 42 |
|---|---|
| 244 | 0.25 * 142 + 0.5*242 + 0.25*342 |
| Top (044) | 0.25*042 + 0.5*142 + 0.25 (zero) |
| Bottom (39944) | 0.5*39842 + 0.25*39942 + 0.25 (zero) |

Note that the top and bottom scan lines, 044 and 39944, respectively, of frame 44 are produced from only two adjacent scan lines (each having pixel color information scaled by 50%) of frame 42. The last term for each of these values in the scaling expression represents a black line.

As indicated above, the R-G-B color information for the pixels of frame 42 is preferably presented in 16-bit format, with five bits of red and blue color information each and six bits of green color information. Before scaling this color information to produce the color information for the pixels of frame 44, however, these values are preferably normalized to 8-bit values, e.g., using zero-padding.

The individual scaling coefficients may be represented in eight-bit format as follows:

$0.5 = (X+1)shr1$; and $0.25 = (X+2)shr2$.

After the color values for the pixels of frame 44 have been computed, these values may then be truncated to five/six bit values to give the new R-G-B color information for the pixels of scan lines in frame 44, where there are five bits of red and blue color information each and six bits of green color information. Frame 44 can then be passed to CSC block 38 as discussed above.

CSC block 38 receives pixel data in R-G-B format where R is Red (5-bits), G is Green (6-bits), and B is Blue (5-bits) and converts the R-G-B information to Y-U-V information. First, the R-G-B values are normalized to eight bits using a mid-banding process as described in application Ser. No. 09/164,942, entitled "Method and Apparatus for Reducing Noise During Lossy Transformation Processes", filed Oct. 1, 1998, by Misha Persiantsev and assigned to the Assignee of the present Application, the complete disclosure of which is incorporated herein by reference. Then, the Y-U-V color components are calculated as follows:

$$Y = -112 + (66/256)*R + (129/256)*G + (25/256)*B$$

$$U = -(38/256)*R - (74/256)*G + (112/256)*B$$

$$V = (112/256)*R - (94/256)*G - (18/256)*B$$

In some embodiments, the Y-U-V video information may be formatted as 4:2:2 digital component video. To achieve this formatting, for every Y component (which represents the intensity of the pixel), the U and the next U components may be averaged before the frame is passed to the video compression unit 22. The same is true for the V components (U and V are the color component of the pixel). So, for every YUV pair (Y1-U1-V1, Y2-U2-V2, etc.), the following operation may be performed:

1. The average values for the U and V pairs are computed:

$$U12 = 0.5(U1+U2)$$

$$V12 = 0.5(V1+V2)$$

2. The data pairs are provided to the video compression unit 22 as (Y1-U12), (Y2-V12), (Y3-U34), (Y4-V34), etc.

Thus a video processing scheme for a digital wireless home network or other computer network environment has been described. Although the foregoing description and accompanying figures discuss and illustrate specific exemplary embodiments, it should be appreciated that the present invention is to be measured only in terms of the claims which follow.

What is claimed is:

1. A method, comprising converting video information organized in a first format to a second format by first scaling the video information to produce vertically scaled video information using a pixel-by-pixel conversion process in which for each group of six scan lines in a frame of the video information, color information for individual pixels which make up the group of six scan lines is scaled to provide color information for pixels in a corresponding group of five scan lines of a frame of the vertically scaled video information and subsequently providing color correction to produce color corrected video information.

2. The method of claim 1 wherein scaling the video information includes applying an anti-flicker filter to the vertically scaled video information to produce scaled video information.

3. The method of claim 1 wherein scaling factors used for the color information for individual pixels of each group of six scan lines in the frame of the video information varies between scan lines.

4. The method of claim 3 wherein color information for pixels of a first scan line of the group of six scan lines from the frame of the video information is scaled by a factor of 1 to form the color information for the pixels of a first scan line of the group of five scan lines from the frame of vertically scaled video information.

5. The method of claim 4 wherein the color information for pixels in the remaining scan lines of the group of six scan lines from the frame of video information is merged on a scan line basis to form the color information for the pixels of the remaining scan lines of the group of five scan lines from the frame of vertically scaled information.

6. The method of claim 5 wherein the color information for pixels in the remaining scan lines of the group of six scan lines from the frame of video information is scaled by a predetermined factor on a scan line basis prior to being merged to form the color information for the pixels of the remaining scan lines of the group of five scan lines from the frame of vertically scaled information.

7. The method of claim 2 wherein the anti-flicker filter uses three scan lines of a frame of the vertically scaled video information to produce one scan line of a frame of the scaled video information.

8. The method of claim 2 wherein the anti-flicker filter comprises a pixel-by-pixel conversion process wherein for each group of three scan lines in a frame of the vertically scaled video information, color information for individual pixels which make up the three scan lines is scaled to provide color information for pixels in a corresponding scan line of a frame of the scaled video information.

9. The method of claim 8 wherein scaling factors used by the anti-flicker filter for scaling the pixel color information of the three scan lines of the frame of the vertically scaled video information varies on a scan line basis.

10. The method of claim 9 wherein the anti-flicker filter is configured to normalize multi-bit values of red, green and blue color information of the pixels in the three scan lines of the frame of the vertically scaled video information before applying the scaling factors.

11. The method of claim 2 wherein color correcting the scaled video information comprises converting R-G-B color information of the scaled video information to Y-U-V color information.

12. The method of claim 11 wherein color correcting the scaled video information further comprises normalizing the R-G-B color information to an eight bit format prior to converting the R-G-B color information to Y-U-V color information.

13. The method of claim 12 wherein the Y-U-V color information for the color corrected video information is formatted as 4:2:2 digital component video.

14. The method of claim 1 wherein the color information for pixels in the scan lines of the group of six scan lines from the frame of video information is normalized prior to being scaled.

15. A network server, comprising:
a video processor configured to convert video information from a first format to a second format by first scaling the video information to produce vertically scaled video information in which for each group of six scan lines in a frame of the video information, color information for individual pixels which make up the group of six scan lines is scaled to provide color information for pixels in a corresponding group of five scan lines of a frame of the vertically scaled video information and to subsequently provide color correction to produce color corrected video information; and a radio configured to transmit the color corrected video information to at least one network client across a wireless link.

16. The network server of claim 15 wherein the color corrected video information is compressed prior to transmission.

17. The network server of claim 15 wherein the video processor is further configured to apply an anti-flicker filter to the vertically scaled video information to produce scaled video information.

18. A computer network, comprising:
a server configured to convert video information from a first format to a second format by first scaling the video information to produce vertically scaled video information in which for each group of six scan lines in a frame of the video information, color information for individual pixels which make up the group of six scan lines is scaled to provide color information for pixels in a corresponding group of five scan lines of a frame of the vertically scaled video information and to subsequently provide color correction to produce color corrected video information; and a client coupled in wireless communication with the server and configured to receive the color corrected video information.

19. The computer network of claim 18 wherein the server is further configured to apply an anti-flicker filter to the vertically scaled video information to produce scaled video information.

20. The computer network of claim 18 wherein scaling factors used for the color information for individual pixels of each group of six scan lines in the frame of the video information varies between scan lines.

21. The computer network of claim 20 wherein color information for pixels of a first scan line of the group of six scan lines from the frame of the video information is scaled by a factor of 1 to form the color information for the pixels of a first scan line of the group of five scan lines from the frame of vertically scaled video information.

22. The computer network of claim 21 wherein the color information for pixels in the remaining scan lines of the group of six scan lines from the frame of video information is merged on a scan line basis to form the color information for the pixels of the remaining scan lines of the group of five scan lines from the frame of vertically scaled information.

23. The computer network of claim 22 wherein the color information for pixels in the remaining scan lines of the group of six scan lines from the frame of video information is scaled by a predetermined factor on a scan line basis prior to being merged to form the color information for the pixels of the remaining scan lines of the group of five scan lines from the frame of vertically scaled information.

24. The computer network of claim 19 wherein the anti-flicker filter uses three scan lines of a frame of the vertically scaled video information to produce one scan line of a frame of the scaled video information.

25. The computer network of claim 19 wherein the anti-flicker filter comprises a pixel-by-pixel conversion process wherein for each group of three scan lines in a frame of the vertically scaled video information, color information for individual pixels which make up the three scan lines is scaled to provide color information for pixels in a corresponding scan line of a frame of the scaled video information.

26. The computer network of claim 25 wherein scaling factors used by the anti-flicker filter for scaling the pixel color information of the three scan lines of the frame of the vertically scaled video information varies on a scan line basis.

27. The computer network of claim 26 wherein the anti-flicker filter is configured to normalize multi-bit values of red, green and blue color information of the pixels in the three scan lines of the frame of the vertically scaled video information before applying the scaling factors.

28. The computer network of claim 19 wherein color correcting comprises converting R-G-B color information of the scaled video information to Y-U-V color information.

29. The computer network of claim 28 wherein color correcting further comprises normalizing the R-G-B color information to an eight bit format prior to converting the R-G-B color information to Y-U-V color information.

30. The computer network of claim 29 wherein the Y-U-V color information for the color corrected video information is formatted as 4:2:2 digital component video.

31. The computer network of claim 18 wherein the color information for pixels in the scan lines of the group of six scan lines from the frame of video information is normalized prior to being scaled.

* * * * *